March 2 1943. E. M. SHOOK 2,312,934
GAIN CONTROL FOR SEISMOGRAPH AMPLIFIERS
Filed Feb. 1, 1938 4 Sheets-Sheet 1
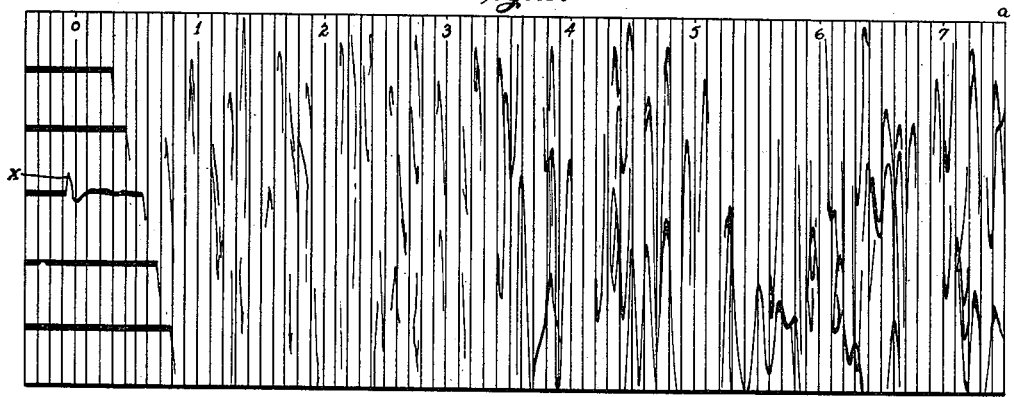
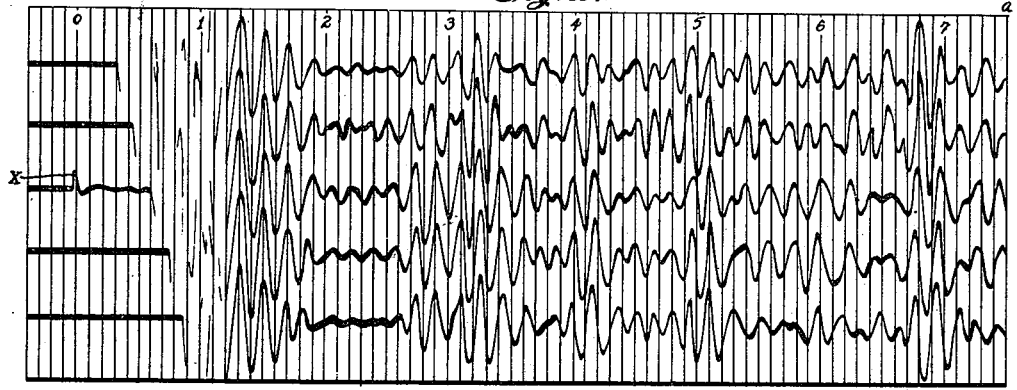
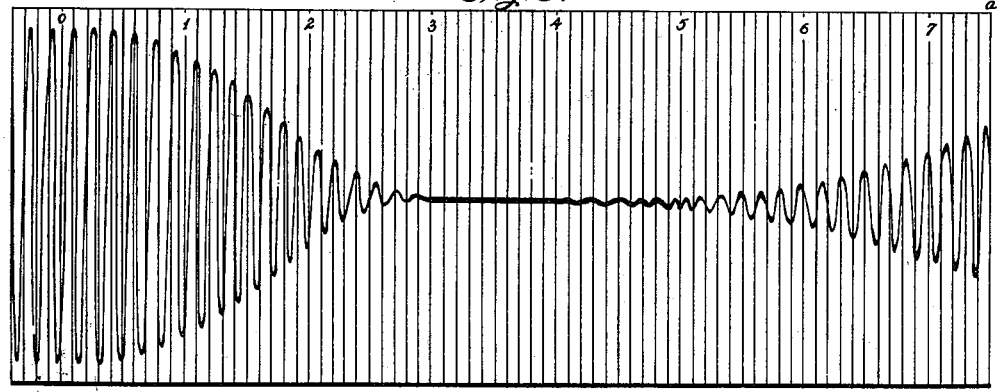
Inventor
Earley M. Shook
By Dallas R. Lamont
Attorney

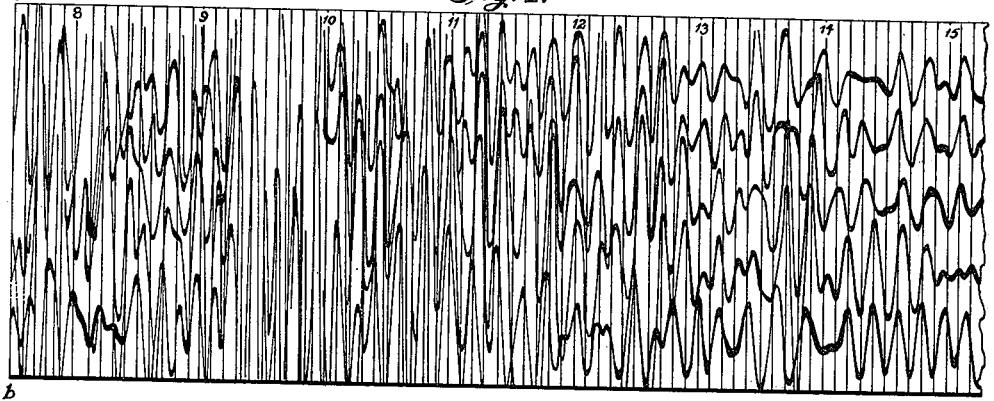
Fig. 1ᵇ
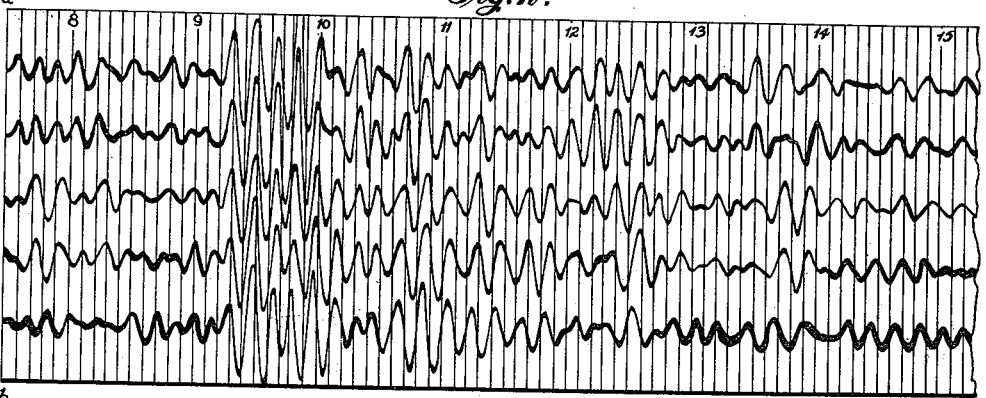
Fig. 2ᵇ
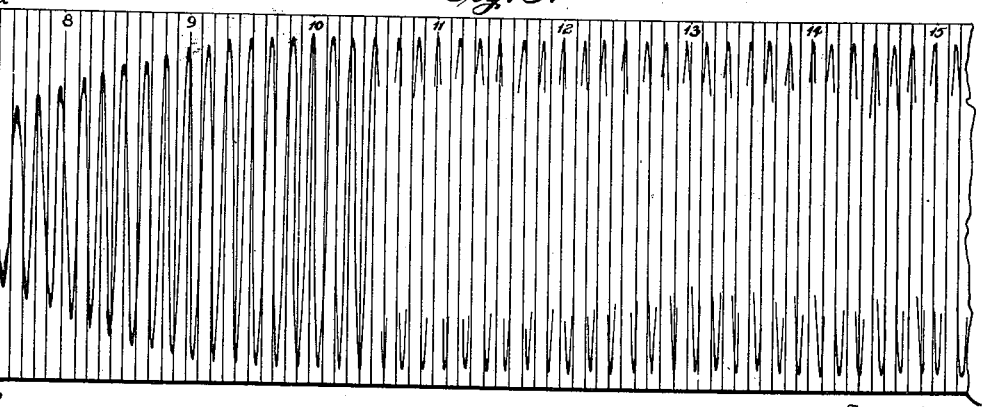
Fig. 3ᵇ
Inventor
Earley M. Shook

March 2 1943. E. M. SHOOK 2,312,934
GAIN CONTROL FOR SEISMOGRAPH AMPLIFIERS
Filed Feb. 1, 1938 4 Sheets-Sheet 3
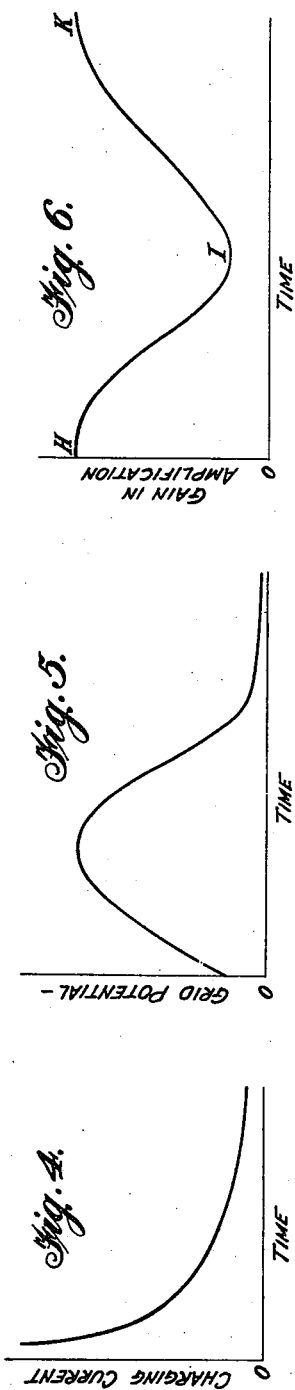
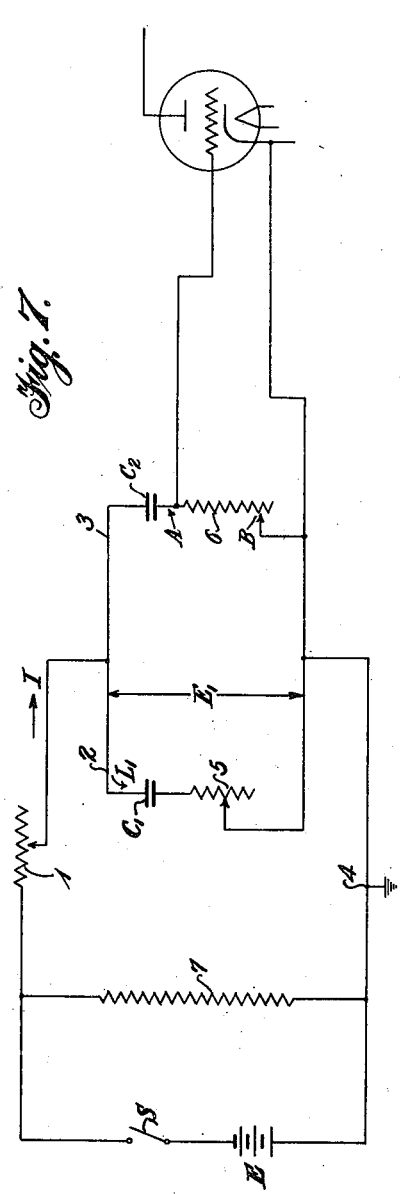
Inventor
*Earley M. Shook*
By *Dallas R. Lamont*
Attorney

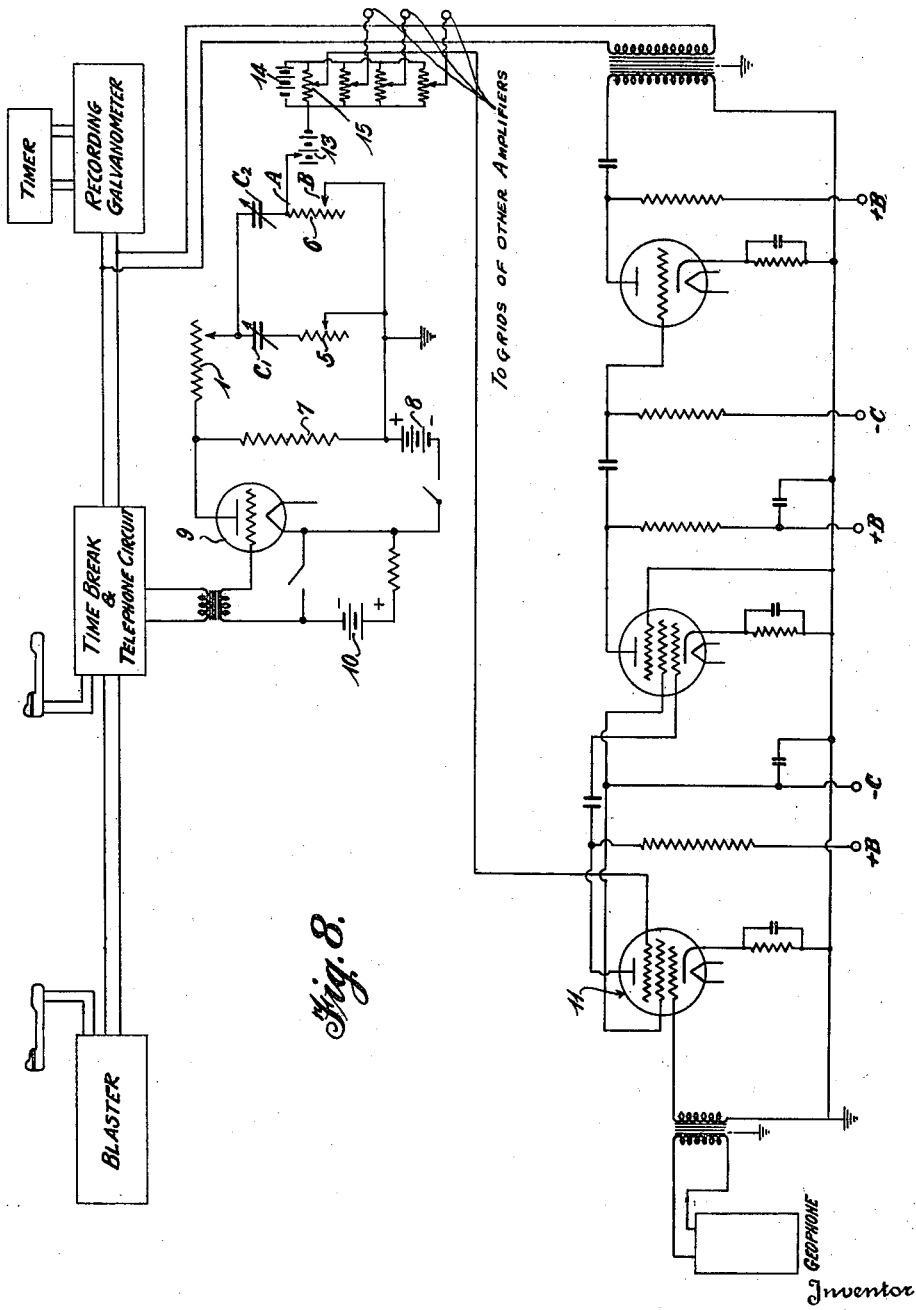

Patented Mar. 2, 1943

2,312,934

UNITED STATES PATENT OFFICE 2,312,934

GAIN CONTROL FOR SEISMOGRAPH AMPLIFIERS

Earley M. Shook, Dallas, Tex., assignor, by mesne assignments, to Socony-Vacuum Oil Company, Incorporated, New York, N. Y., a corporation of New York Application February 1, 1938, Serial No. 188,068

1 Claim. (Cl. 177—352)

This invention relates generally to a method and apparatus for surveying the subsurface strata of the earth by the use of artificially created seismic waves, and more particularly to the method and apparatus for recording all the data on a single spread when shot in one direction by detonating a single charge of explosive.

In the art of exploring subsurface strata by the use of artificially created seismic waves, it is customary to detonate a charge of explosives at a point on or near the earth's surface and record the seismic waves generated by the detonation of the explosives at predetermined points removed from the point of generation. From the data thus recorded it is possible to ascertain the depth of subsurface horizons, from which the seismic waves that are recorded have been reflected. The depths of these subsurface horizons are computed from the velocity of the seismic waves and the time it takes for them to travel down to the reflecting horizon and return to the detecting instrument. This velocity will vary, dependent upon the density and elastic coefficients of the materials through which it travels. In addition to considering the velocity at which reflected waves will travel in subsurface strata, it is necessary to consider the velocity of their transmission through the unconsolidated, weathered, sedimentary surface of the earth.

The usual procedure when the exploration of an area is begun is to develop these velocities in the different strata by what is termed a "velocity program" which entails recording records of seismic waves which will give directly the velocities in these particular strata. After having once ascertained these velocities, they can be used throughout the area in computing the depth of the particular reflecting strata. Due to the fact that the weathered surface layer of the earth varies in thickness, it is necessary that the thickness of this weathered layer be computed for each spread or location of geophones. To obtain the data from which the thickness of the weathered layer is computed, charges of explosives are detonated at the selected shot points and the velocity of the wave travel through the weathered or surface layer is determined. It is necessary that the gain in amplification of a vacuum tube amplifier be at the maximum in order that the break in the seismogram trace, resulting from the arrival at the geophone of the first impulse of energy, by very definite. As a consequence heretofore, it has been necessary to record these data on a separate seismogram from that on which reflected waves are recorded. Such a procedure would necessitate recording a plurality of seismograms to obtain the data in the weathered layer and records of the reflected waves from shallow subsurface strata. Since the high cost of field operations makes the time factor of paramount importance, it is desirable to record all of these data on a single record from the detonation of a single charge of explosives. Such a procedure would result in tremendous savings in the amount of explosives required and in time required by the field party to record the data necessary on a single spread, as well as the time required for an interpreter to observe the rata on a plurality of seismograms.

With previous methods of recording these data by the use of a plurality of charges of explosives, from which seismic waves have been recorded on a corresponding number of seismograms, it has been almost impossible to duplicate the conditions under which each charge of explosive is detonated, due to several factors, the most important of which being the changes in the conditions affecting the medium in which the shot is planted. When one charge of explosives is detonated in the bottom of a shot hole, a pocket or cavity is formed in some formations, while in others the bottom of the hole is filled up, due to the fact that the medium forming the walls of the cavity is of loosely packed material. This sometimes results in a loss of as much as 10' in the depth of the hole, and, in extreme cases, where the bottom of the hole is in a quick sand material, as much as 20' or 30' of the hole are lost by the detonation of a single charge in it. Such changes in conditions under which successive charges of explosives are detonated introduce variable factors in the apparent velocities of the recorded waves. These variable factors would make profiles computed from these data in error.

Therefore, the primary object of this invention is the provision of a method and apparatus whereby all the data that it is required to be recorded on a particular spread when shot from one direction can be recorded on a single seismogram.

Another object of this invention, is in the provision of a method and apparatus for controlling the gain in amplification to effect a definite recording of first impulses and reflected waves from shallow as well as deep horizons.

Still another object of this invention is in the provision of means whereby a vacuum tube amplifier is allowed to remain at or near its maximum sensitivity until the first impulse of direct traveling waves have been recorded; then suppressing the gain in amplification over a predetermined period and then allowing it to expand exponentially with time.

This invention has for another of its objects a provision of means whereby the suppression of the gain in amplification can be initiated by the electrical impulse that is received and recorded at the instant of detonation of the charge of explosive.

Still another object of this invention is to provide means whereby the suppression of the gain in amplification can be initiated by an impulse which has been detected by a geophone which is connected to the input of a seismograph amplifier.

This invention also contemplates the provision of means whereby the gain in amplification of a vacuum tube amplifier can be automatically initiated by the discharge of the gas triode vacuum tube, a relay, or manually with a switch.

Another object of this invention is the provision of means which are adapted for use with a conventional seismograph amplifier.

Other objects and advantages will become apparent from the following detailed description when considered with the attached drawings in which:

Figures 1a and 1b, placed end to end, illustrate a seismogram recorded in the conventional manner.

Figures 2a and 2b similarly illustrate a seismogram of the type that can be recorded by the method and with the apparatus of this invention.

Figures 3a and 3b, placed end to end, illustrate a voltage wave that would result from passing a wave of constant amplitude through an electric seismograph amplifier employing the control forming the subject matter of this invention.

Figure 4 is a curve that has been plotted with condenser charging current as ordinates and time as abscissae.

Figure 5 is a curve which has been plotted with grid potential as ordinates and time as abscissae.

Figure 6 is a curve which has been plotted with gain in amplification as ordinates and time as abscissae representing the instantaneous values of gain in amplification in recording a seismogram such as is illustrated in Figures 2a and 2b.

Figure 7 is an electrical circuit showing time lag circuits for controlling the grid potential on one or more vacuum tubes in a conventional seismograph amplifier.

Figure 8 is an electric circuit diagrammatically showing an electric seismograph amplifier including a detailed circuit of the control forming the subject matter of this application.

Referring to the drawings in detail, particularly Figures 1a and 1b there is illustrated a seismogram which shows the manner in which the direct traveling waves, as well as the reflected waves, from five geophones or detectors are conventionally recorded on a single seismogram. The transverse lines indicate definite and equal small intervals of time, such, for example, as .01 second. It will be noted that there is an indication known in the art as a time break on the middle trace at X indicating the instant at which the charge of explosive was detonated. The period of time elapsing between the instant at which the charge was detonated and the arrival of the waves generated thereby at the geophone is represented by the number of spaces and fractions thereof between the transverse lines on the seismogram that are present between the indication X, denoting the time break or instant of explosion, and the point where a discontinuity occurs on the respective traces. To record a record such as that illustrated the charge of explosive and the five geophones are located in the same vertical plane and the geophones are equidistantly spaced one from the other. The discontinuity in the respective traces is indicative of the instant at which the first energy strikes the geophone. Although this first initial impulse is generated by direct traveling waves of abrupt wave front, there are many other waves of different frequencies and velocities that follow the wave which delivers the initial impulse to the detector. Due to the fact that these direct traveling waves are of so much greater amplitude than reflected waves, their attenuated wave train would tend to obscure reflected waves from shallow horizons that would arrive at the geophone or detector a relatively short interval of time after the first impulse. As shown by the illustration in Figures 1a and 1b, it is impossible to distinguish any of the reflected waves from shallow horizons, from direct traveling waves. This is partly due to the fact that the direct traveling waves completely obscure the reflected waves, and partly due to the fact that there is less absorption and resulting loss of energy in waves which have been reflected from shallow horizons than those which have been reflected from deep horizons. From this it readily becomes apparent that some means must be provided for controlling both the amplitude of the direct traveling waves after the first impulse has been recorded, and the amplitude of reflected waves from shallow horizons. Such control of amplification is illustrated in Figures 2a and 2b. These figures illustrate a seismogram such as would be recorded by the method and apparatus forming the subject matter of this invention. In this illustration it will be noted that the first arrival of energy to the detector or geophone is recorded on the seismogram at an amplitude corresponding to that disclosed in Figure 1a. Additionally, it will be noted that after all the first breaks have been recorded, the gain in amplification in all amplifiers is suppressed to some small value, which, in some cases, can be zero. Then, from this point the gain in amplification as produced by the amplifier expands exponentially with time, resulting in a record that is uniformly trimmed, showing reflections which have been recorded with almost constant amplitude from horizons as deep as it is practical to correlate or profile. A record such as that illustrated in Figures 2a and 2b in addition to giving definite data from which the thickness of the weathered layer can be checked at each spread, also gives the reflections from all horizons that it is desired to work or profile. Since these are all the data that are required from seismic waves which have been recorded in one direction on a particular spread, there is no necessity for detonating more than one charge of explosive and recording more than one seismogram. This obviously results in a tremendous saving of time, explosives, and a saving in depreciation of the equipment.

In Figure 7 there is shown diagrammatically an electric circuit by means of which a grid potential of a vacuum tube can be varied from a relatively small negative value to a large negative value and back to a relatively small negative value automatically in a predetermined period of time. In the circuit there is connected in series a source of potential E, a switch S, a variable resistance 1, and parallel impedance circuits 2 and 3. The impedance circuits 2 and 3 each consist of a condenser and variable resistance in series. For the proper functioning of this control, the impedance in circuit 2 should be low as compared to that in circuit 3. The positive terminal of the source of potential E is grounded at the point 4, thereby bringing this point to zero potential. When the switch S is closed in the circuit a current I will flow, as indicated by the arrow on the diagram, through the variable resistance 1 to the condensers $C_1$ and $C_2$ to charge them. The impedance 5 being relatively low as compared to the impedance 6, the current flowing into circuit 2, at first will be correspondingly high as compared to that flowing in the circuit 3. The high value of current through the variable resistance 1 that begins to flow at the instance of closing switch S creates a high IR drop. Assuming that the value of potential across the parallel circuits is E', neglecting the internal resistance of the battery E and the resistance 7, then E' will at all times equal to $E-IR$. Since the impedance of the circuit 3 is high as compared to that in circuit 2 a relatively low value of current will flow through it at first. As the condenser $C_1$ becomes charged the current through the resistance 1 will accordingly decrease to give a decreased IR drop and a resultant increase in E' which in turn will tend to change the rate of charge of condenser $C_2$ to effect an IR drop between the points A and B of resistance 6. This IR drop will at the time of closing the switch S be small, but will increase in the manner illustrated by the curve in Figure 5 to a maximum, and finally as the condenser $C_2$ becomes fully charged will decrease to zero. The IR drop across the points A and B of the resistance 6 can be utilized, as indicated by the diagram, to vary the grid potential on a radio vacuum tube.

By varying the grid potential on a vacuum tube in the manner illustrated by the curve in Figure 5, the gain in amplification derived from that tube can be controlled in the manner illustrated by the curve in Figure 6.

The resistance 7 is connected in the circuit as shown to dissipate the energy stored up in the condensers $C_1$ and $C_2$ when the switch S is opened. After the charge of the condensers $C_1$ and $C_2$ has been dissipated, the system is ready for a repetition of the cycle.

In Figure 8 there is shown a modification of the circuit diagram shown in Figure 7 in that in this instance the circuit is incorporated in that of an electric seismograph and utilizes a gas triode of the type sold on the market under the trade name "Thyratron" to initiate its operation instead of the switch S shown in Figure 7. The battery E also shown in Figure 7 has been replaced by the battery 8 and the charging current for condensers $C_1$ and $C_2$ is the plate current supplied by the gas triode 9. It is a characteristic of a gas triode of this type that if a grid is placed between a cathode and an anode of a hot cathode tube containing gas, and if the grid is made sufficiently negative, it will prevent the arc from striking because under these conditions there is no accelerated field around the cathode. The electrons, therefore, cannot acquire sufficient velocity to ionize. However, when the grid is made positive, the electrons are accelerated toward it, they collide with gas atoms, ionize these and the arc strikes. Further it can be seen that a negative grid prevents the arc from striking and a positive grid allows it to strike effecting a flow of current between the cathode and anode of the tube.

Further after the arc has struck, it presents the peculiar feature that the grid has no more control of it and the current will continue to flow in the plate circuit until some portion of this circuit is broken.

With further reference to Figure 8, it will be noted that there is a negative grid potential placed on the grid of the gas triode 9 by means of the battery 10. This grid potential is adjusted so that it will be sufficiently small that a positive impulse from the time break in telephone circuit will change the bias on the grid to a positive value, allowing the arc to strike in the triode with a resultant flow of plate current from it. The remainder of the cycle of operation will be the same as that described in connection with Figure 7. However, in this embodiment of the invention the IR drop between the points A and B of the resistance 6 is utilized as a varying grid potential for the suppressor grid in tube 11 of a conventional amplifier. Although the operation of the control in Figure 8 is initiated by a signal from the time break and telephone circuit generated at the instant of detonation of the charge of explosives, the operation can be initiated by the signal generated by a geophone vibrated by the first seismic waves that are detected. In this last use, however, the input circuit of the gaseous discharge tube would be connected to the output of an amplifier which is not associated with the time break. When the initiation of the automatic control is effected by the time break signal, there must of necessity be an elapsed period of time before the direct traveling waves reach the geophones which are collaterally spaced from the point of detonation, and unless this gain in amplification is caused to decrease exponentially rather than instantaneously, the direct traveling waves could not be recorded with high gain.

If a control such as that shown in Figure 8 is used and its operation is initiated by the time break signal, dependent upon the value of the resistance 1 and the position of the points A and B on the resistance 6 the amplification characteristic of the amplifier will be such that if a wave of known constant amplitude is passed through the amplifier the resultant record will be as illustrated in Figures 3a and 3b. The period of time in which the suppression of the gain in amplification is being effected, and the period of time in which an expansion of the gain in amplification is being effected, will be dependent upon the values of the resistances 1, 5 and 6.

Referring to Figure 8 and to the curve of Figure 6, a further detailed description of the circuit operation is as follows: An impulse from the blaster via the telephone line is impressed on the input circuit of the gas triode tube and full plate current starts flowing immediately through the resistor 7. This instant corresponds to "0" time on curve 6. The IR drop across 7 is impressed across the circuit containing resistance 1 in series with the two parallel branches, each of which contains a resistance and condenser in series. The branch containing condenser $C_1$ and resistor 5 has a relatively short time constant, while the branch containing $C_2$ and 6 has a relatively long time constant. This relation is made to suit the application of the circuit. As soon as the IR drop appears across 7, both parallel condensers start charging through the common resistance 1 and through the individual resistors to which each is connected. At this point it should be noted that resistance 1 controls the time constant of both parallel circuits, while individual control is obtained by the resistor in the individual circuits. Maximum current begins to flow through resistance 1 as soon as the (IR drop) voltage appears across resistor 7. Since there is maximum current in 1, there must be at this time maximum IR drop across resistor 1. Further, since the circuit of condenser $C_1$ and resistor 5 have a short time constant, most of this initial current through resistor 1 will be flowing to charge $C_1$. As $C_1$ becomes charged, less current flows through resistance 1 and less IR drop appears across resistor 1, more voltage appears across the circuit of condenser $C_2$ and resistor 6 thus charging $C_2$ and causing a voltage (IR) drop across resistance 6. With the polarities as shown, the point A begins at zero potential and gradually assumes a negative potential while the above mentioned events are taking place. Since the point A is connected to the grid of the amplifier tube, the grid goes negative the same as the point A, and the gain in amplification decreases in the same way. This is shown between the points H and I, Figure 6. The point I corresponds to the point where the charging current of $C_2$ is greatest. The time between the points H and I is determined by the value of the variable resistors 5 and 1. At the point I, $C_1$ is virtually charged and the time for the gain is amplification to reach the point K is determined by the value of the variable resistor 6, assuming of course resistor 1 was previously set. The battery 13 adjusts the maximum and/or initial settings of all the amplifiers, while the variable potentiometers 15 adjust the maximum and/or initial settings of amplifiers individually.

Controlling the gain in amplification in the manner described above a record such as that illustrated in Figures 2a and 2b can be recorded giving definite first breaks from which data can be obtained for computing the thickness of the weathered layer of the earth's surface in the vicinity of the geophone, as well as definite reflections of uniform amplitude from both shallow and deep reflecting horizons.

Proper adjustment will allow the first breaks to be recorded distinctly while the amplifiers are virtually at maximum sensitivity and then the sensitivity will be suppressed as desired.

The suppression may be initiated by the first break impulse from a geophone if proper arrangements of elements are made.

It is obvious to one skilled in the art that this control can be used equally well to vary the bias on either the control grid or the suppressor grid of one or more vacuum tubes in any conventional amplifier.

I claim:

In a seismograph circuit comprising a seismometer, an electrical amplifier and a recorder, the improvement that comprises a control circuit for controlling the degree of amplification of the amplifier, said control circuit including: a primary control circuit for the amplifier adapted to normally maintain the amplifier at a relatively high degree of amplification, said primary control circuit being a means for maintaining a bias on the grid of at least one thermionic tube in the amplifier; a secondary control circuit including a source of potential, a condenser, a means for applying said potential through said condenser across a resistance in said primary control circuit in such a manner that the secondary control circuit, if acting alone, would instantaneously cause the primary control circuit to reduce the degree of amplification of the amplifier to a relatively low degree and gradually allow the primary control circuit to return the amplifier to its normal high degree of amplification; and a third control circuit including a condenser and a resistor connected in series across the condenser in the secondary control circuit and the resistance in the primary control circuit so as to delay the application of potential across said first mentioned condenser and resistance and thus delay the reduction in amplification and cause it to take place gradually.

EARLEY M. SHOOK.